(12) United States Patent
Hofer

(10) Patent No.: US 6,343,685 B1
(45) Date of Patent: Feb. 5, 2002

(54) APPARATUS FOR CONVEYING SHEET-LIKE ARTICLES

(75) Inventor: Roland Hofer, Murgenthal (CH)

(73) Assignee: Hunkeler AG Papierverarbeitungsmaschinen, Wikon (CH)

( * ) Notice: Subject to any disclaimer, the term of this patent is extended or adjusted under 35 U.S.C. 154(b) by 0 days.

(21) Appl. No.: 09/533,997

(22) Filed: Mar. 24, 2000

(30) Foreign Application Priority Data

Mar. 24, 1999 (CH) .............................................. 0555/99

(51) Int. Cl.[7] ........................ B65G 47/10; B65G 47/46; B65G 37/00; B65G 47/34; B65G 47/82
(52) U.S. Cl. .................. 198/370.09; 198/597; 198/607; 198/610
(58) Field of Search ............................ 198/370.09, 570, 198/597, 607, 610

(56) References Cited

U.S. PATENT DOCUMENTS

| | | | | |
|---|---|---|---|---|
| 3,134,476 A | * | 5/1964 | Pierson et al. ...... | 198/370.09 X |
| 4,962,841 A | * | 10/1990 | Kloosterhouse .... | 198/370.09 X |
| 5,609,236 A | * | 3/1997 | Neukam ............... | 198/370.1 X |
| 5,743,375 A | * | 4/1998 | Shyr et al. ........... | 198/370.1 X |
| 5,868,238 A | * | 2/1999 | Bonnet ................. | 198/370.1 X |

FOREIGN PATENT DOCUMENTS

| | | |
|---|---|---|
| EP | 957236 | 3/1962 |
| EP | 0791426 | 8/1997 |
| EP | 29700863 | 1/1998 |
| JP | 61124424 | 12/1986 |

* cited by examiner

Primary Examiner—Christopher P. Ellis
Assistant Examiner—Gene O. Crawford
(74) Attorney, Agent, or Firm—Oliff & Berridge, PLC

(57) ABSTRACT

A first conveying device has first bearing elements which are arranged parallel to one another and define a planar first bearing surface. The first bearing elements are driven such that they can be displaced in a first conveying direction. A second conveying means has second bearing elements which run parallel to one another and to the first bearing elements and define a second planar bearing surface. The second bearing elements are designed as conveying elements which are driven in a second conveying direction, which runs at right angles to the first conveying direction. The second bearing elements can be displaced, by means of a lifting drive, in a lifting direction, which runs at right angles to the two bearing surfaces. The first and second bearing elements are spaced apart from one another and arranged such that, upon displacement of the second bearing elements, the latter can be pushed through the interspaces between the first bearing elements. Thus, either the first bearing surface or the second bearing surface can be arranged above the other bearing surface.

15 Claims, 4 Drawing Sheets

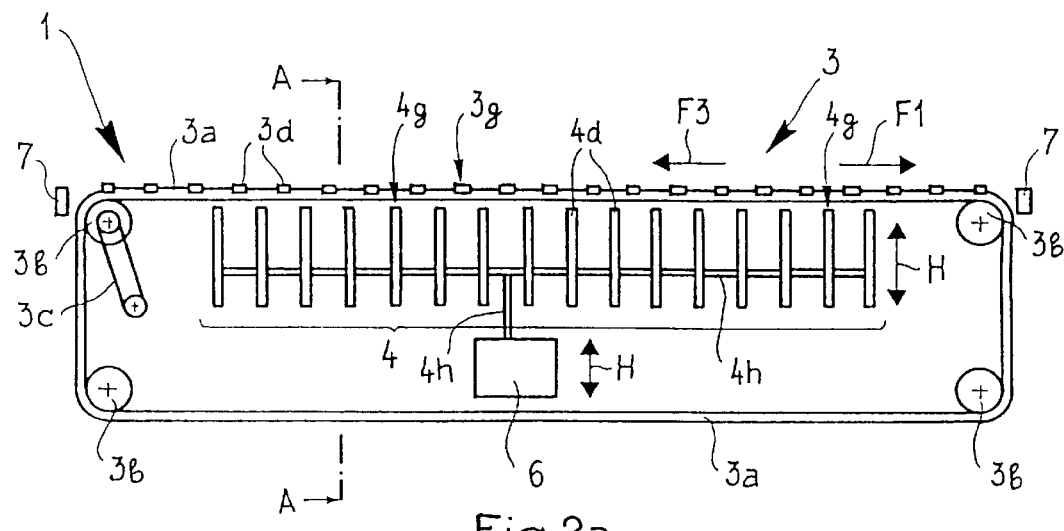
Fig.2a
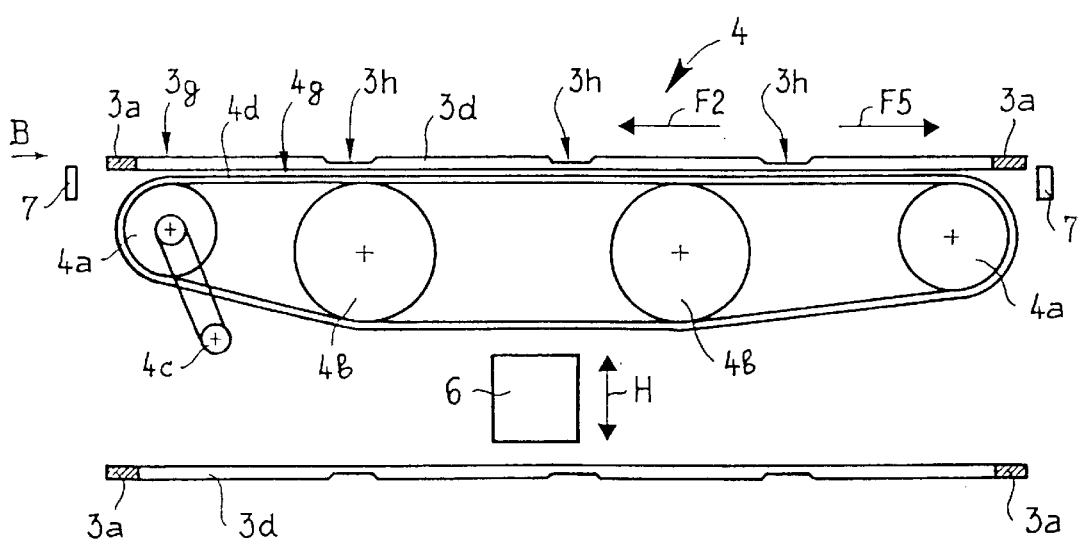
Fig.2b (A-A)

APPARATUS FOR CONVEYING SHEET-LIKE ARTICLES

BACKGROUND OF THE INVENTION

1. Field of Invention

This invention relates to an apparatus for conveying sheet-like articles.

2. Description of Related Art

When sheet-like articles, and in particular stacks of sheet-like articles, are being conveyed, there are problems in terms of the articles being defined, of the stacked, sheet-like articles slipping in relation to one another or of the stacks even falling apart. An apparatus for conveying sheet-like articles is used, for example, in order to feed a stack of loose, printed sheets to a binding apparatus. Successful binding is only possible when the stack is fed to the binding apparatus in the correctly aligned manner.

SUMMARY OF THE INVENTION

The object of the invention is to configure an apparatus for conveying sheet-like articles, or stacks of sheet-like articles, such that these can be transported in a careful and dimensionally stable manner.

The object is achieved, in particular, by an apparatus for conveying sheet-like articles which comprises a first and a second conveying means, it being the case that the first conveying means has first bearing elements which are arranged parallel to one another and define an essentially planar, first bearing surface and can be driven such that they can be displaced in a first conveying direction, it being the case that the second conveying means has second bearing elements which run parallel to one another and to the first bearing elements and define a second, essentially planar bearing surface, the second bearing elements being designed as conveying elements which can be driven in a second conveying direction, which runs transversely to the first conveying direction, it being the case that there is provided a lifting apparatus which allows either the first or the second bearing elements to be displaced in a lifting direction, which runs essentially at right angles to the bearing surface, and it being the case that the first and second bearing elements are configured, and spaced apart from one another to form an interspace, such that, upon displacement in the lifting direction, the second bearing elements can be displaced through the interspaces between the first bearing elements, with the result that either the first bearing surface or the second bearing surface is arranged above the other bearing surface.

The conveying apparatus according to the invention has a first conveying means, with first bearing elements driven in a first conveying direction, and a second conveying means, with second bearing elements driven in a second conveying direction. A multiplicity of first and second bearing elements are provided and are arranged such that they each form a planar, first and second bearing surface. The conveying apparatus, according to the invention, has the advantage that the sheet-like articles, or stacks of sheet-like articles, resting on the bearing elements are transported very carefully in the respective conveying direction. The articles are not subjected either to deformation or to a flexing movement, as would be the case, for example, if they were to slide over rollers. In addition, the apparatus according to the invention, is configured such that the second bearing elements can be displaced through the interspaces of the first bearing element from beneath. This configuration has the advantage that a sheet-like article can be transferred very easily and carefully from the first bearing elements to the second bearing elements, and can be transported in a second conveying direction by the second bearing element. The apparatus, according to the invention, is thus particularly suitable for conveying further in different, selectable directions sheet-like articles which have been supplied from one feed direction, the articles being conveyed further preferably either in the feed direction or in a direction perpendicular to the feed direction. Such a conveying apparatus is also referred to as a transfer station or a transfer unit.

In a further, advantageous embodiment, the conveying apparatus additionally comprises third bearing elements which form a third bearing surface. The third bearing elements allow an article resting on the second bearing elements to be raised. This has the advantage that a movement of the second bearing elements does not have any effect on the article raised in this way, with the result that the article resting on the third bearing elements remains in its current position. This selective stopping of articles makes it possible to change, for example, the order of the articles discharged by the conveying apparatus. In addition, articles resting on the conveying apparatus may be realigned or aligned differently. For example, some or all of the articles resting on said apparatus may be conveyed further in a state in which they are offset laterally in relation to the feed direction.

The apparatus, according to the invention, has the additional advantage that the sheet-like articles may be conveyed reliably and carefully irrespective of their format.

The apparatus, according to the invention, is suitable, in particular, for conveying individual sheet-like articles or stacks of such articles consisting of paper, plastics, plastic films, woven fabrics or textiles. However, it is not just sheet-like articles which may be conveyed.

BRIEF DESCRIPTION OF THE DRAWINGS

The construction and the functioning of the apparatus according to the invention are described hereinbelow with reference to the embodiments illustrated in a particular schematic manner in the figures, in which:

FIG. 2a shows a side view of an exemplary embodiment of the conveying apparatus, it being possible to see the first and second conveying means;

FIG. 2b shows a side view of the second conveying means;

DETAILED DESCRIPTION OF PREFERRED EMBODIMENTS

Figure 1:
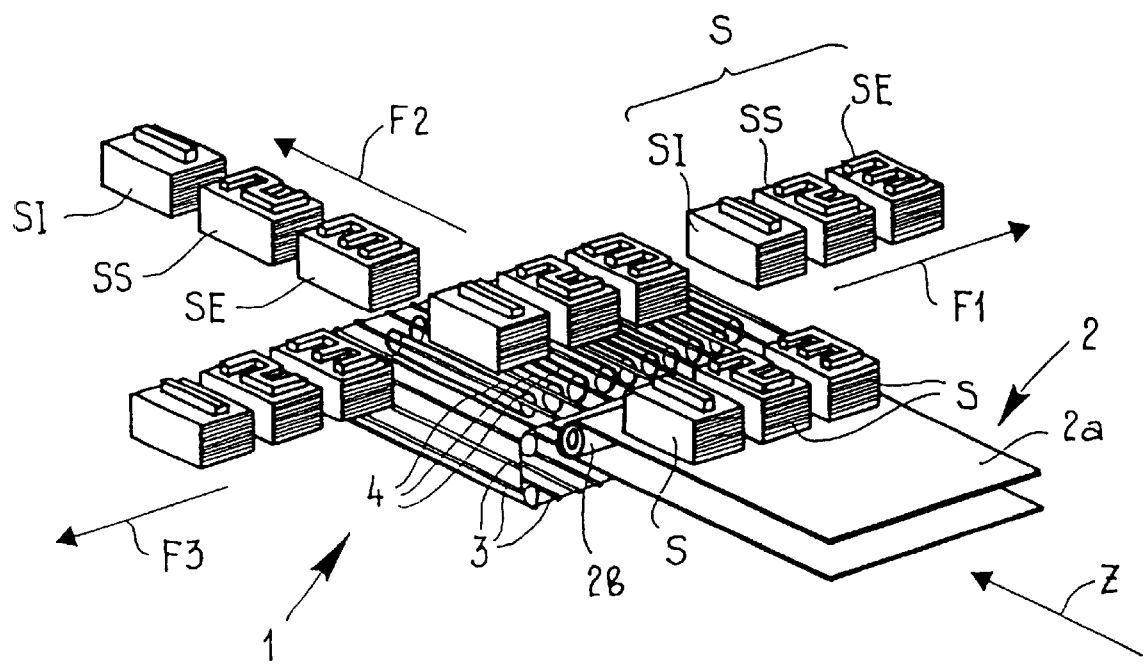
FIG. 1 shows a schematic view of the conveying apparatus with conveyed stacks.

The conveying apparatus 1, according to FIG. 1, is fed in the feed direction Z by a horizontally running conveying belt 2, three stacks S, SE, SS, SI which are located one beside the other and comprise a plurality of individual sheets. The conveying belt 2 may also be used to feed more or fewer than three stacks S one beside the other, depending on the format of the individual sheets. The conveying belt comprises a belt 2a which is deflected on the deflecting roller 2b. The conveying apparatus 1 comprises a second conveying means 4, which is illustrated in detail in FIGS. 2a–2d and receives the stack S from the conveying belt 2 and conveys them as illustrated, by way of example, to the center of the surface area formed by the conveying apparatus 1. In the exemplary embodiment illustrated, the stacks S can be conveyed in three selectable directions F1, F2 or F3. The conveying apparatus 1 also comprises a first conveying means 3, which is illustrated in detail in FIGS. 2a–2d, and allows the stacks S to be conveyed away from the conveying apparatus 1 in the conveying direction F1 or F3, which runs perpendicularly to the feed direction Z. Immediately following the conveying apparatus 1, further transporting apparatuses (not illustrated) such as conveying belts 2 are necessary in order to convey the stacks S further in the conveying direction F1, F2 or F3. In a particularly advantageous configuration of the conveying apparatus 1, the latter is capable of changing the arrangement of the stacks SI, SS, SE in relation to one another and the order thereof, as is illustrated by the stacks SI, SS, SE in the conveying direction F2.

FIG. 2a shows a side view from direction Z of the conveying apparatus 1, which comprises a first conveying means 3 and a second conveying means 4. The first conveying means 3 comprises a belt which is configured, for example, as a chain 3a and, guided over deflecting rollers 3b, forms a continuous circulatory path. The deflecting rollers 3b are configured, for example, as gear wheels which engage in the interspace-containing chain 3a. The shaft of the one of the deflecting rollers 3b is driven by a drive motor via a toothed belt 3c, in order to move the chain 3a in the conveying directions F1 or F3. Arranged on the chain 3a are first bearing elements 3d which are spaced apart at regular intervals in the conveying direction F1, extend perpendicularly to the viewing plane of the drawing and form a first, essentially planar bearing surface 3g. The chain 3a has first bearing elements 3d distributed over its entire circumference, although, in order to simplify the illustration, it is only the first bearing elements 3d which are located at the top which are illustrated in FIG. 2a. Arranged to the left and right of the first conveying means 3 are sensors 7 which allow the presence and the position of a stack S to be detected, in order thus for the movement of the conveying means 3 to be activated correspondingly. The first conveying apparatus 3 allows a stack S resting on the first bearing surface 3g, or on the first bearing elements 3d, or an individual sheet to be conveyed very carefully in the conveying direction F1 or F3 without the risk of flexing.

The conveying apparatus 1 additionally comprises a second conveying means 4, which for its part, comprises a multiplicity of second bearing elements 4d, which are spaced apart form one another in the conveying direction F1 and run parallel to the first bearing elements 3d. The bearing elements 4d are connected fixedly to one another via a connecting means 4h such that the bearing elements 4d form a planar second bearing surface 4g. The conveying apparatus also comprises a lifting apparatus 6 which, in the exemplary embodiment illustrated, is connected to the bearing elements 4d via the connecting means 4h in order to adjust the mutual position of the second bearing surface 4g in relation to the first bearing surface 3g in a lifting direction H, which preferably runs perpendicularly to the bearing surfaces 3g, 4g.

A view of the section along line A—A (FIG. 2a) is illustrated in FIG. 2b. The second conveying means 4 comprises a plurality of conveying arrangements, of which one is shown in side view in FIG. 2b and which runs parallel to one another at a distance apart. Each conveying arrangement comprises two deflecting rollers 4a, two supporting rollers 4b and an elastic belt, for example, a rubber belt, which is guided by the rollers 4a, 4b and forms a second bearing element 4d. The top edges of the second bearing elements 4d form the second bearing surface 4g. The deflecting roller 4a, which is arranged on the left, is driven by a motor 4c in order to drive the second bearing element 4d, which forms a continuous circulatory path, in the conveying direction F2 or F5. Sensors 7 are arranged, once again, in the region of the left- and right-hand ends in order to sense the position of the stacks S. From the sectional illustration according to FIG. 2b, it is also possible to see, in a side view, a first bearing element 3d which is designed as a rectangular bar and is connected fixedly to the chain 3a on the end sides. Each first bearing element 3d may have depressions 3h spaced apart in its longitudinal direction, as is illustrated. These depressions 3h allow a stack S resting on the first bearing surface 3g to be raised up with the aid of a fork-like apparatus engaging in the depression 3h.

Figure 2C:
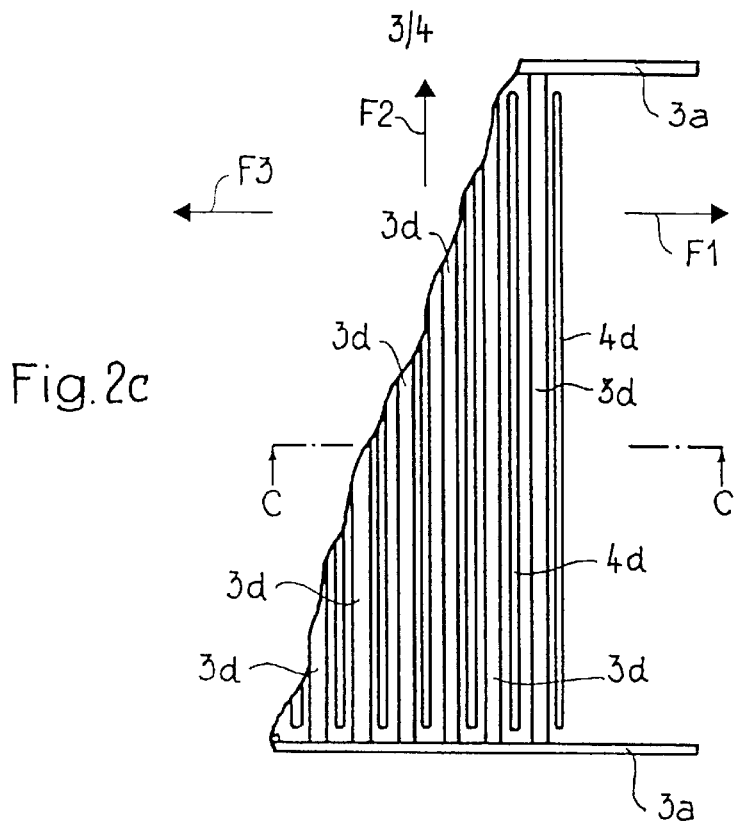
FIG. 2c shows a plan view of the conveying apparatus.

FIG. 2c shows a plan view of the conveying apparatus 1 according to FIGS. 2a and 2b. The chains 3a can be driven in the conveying direction F1 or F3, as a result of which the first bearing elements 3d can be moved in this conveying direction. The chain 3a may be stopped such that, as can be seen from FIGS. 2a and 2c, in each case a second bearing element 4d, comes to rest approximately centrally between a first bearing element 3d in each case. Two bearing elements 3d, arranged one after the other, are spaced apart by a distance 3e which is greater than the width of a second bearing element 4d. This means that he second conveying means 4, in the position illustrated, can be raised in the lifting direction H by the lifting apparatus 6, with the result that the second bearing elements 4d pass through between the first bearing elements 3d and raise a stack S resting originally on the first bearing elements 3d, the stack then coming to rest on the second bearing elements 4d. In this position, the stack S can be conveyed by the second bearing elements 4d in the conveying direction F2, F5 which runs perpendicularly to the conveying direction F1, F3. As soon as the second conveying means 4 has been lowered again into the position illustrated in FIGS. 2a and 2b, the chain 3a and the first bearing elements 3d fastened thereon can be moved in the conveying direction F1, F3 again.

Figure 2D:
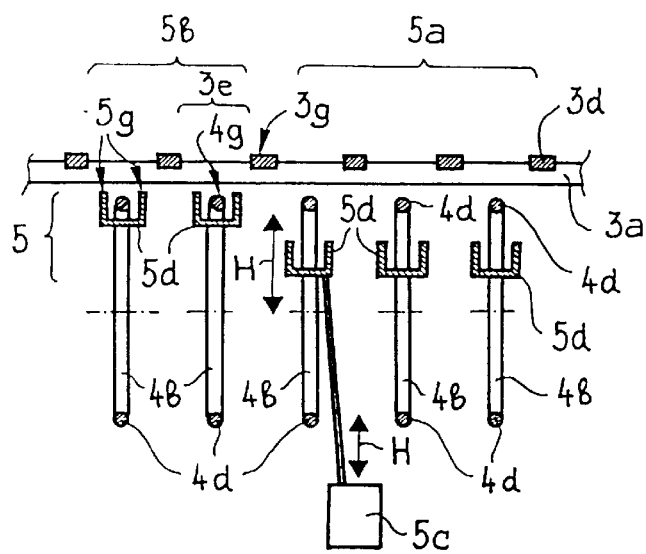
FIG. 2d shows a detail of the side view according to FIG. 2a with an additionally provided third bearing element.
Figure 2D:
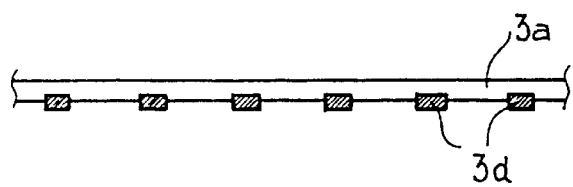

FIG. 2d shows, in an illustration along section line C—C in FIG. 2c, a conveying apparatus 1 which has an additional third conveying means 5. This third conveying means 5 has third bearing elements 5d which are designed as U-shaped bars and run parallel to the second bearing elements 4d. The position of said third bearing elements 5d in relation to the second bearing elements 4d can be adjusted in the lifting direction H via a lifting drive 5c and a force-transmission means 5e. The two third bearing elements 5d which are arranged on the left-hand side of FIG. 2d, are located in an upper position, in which in each case a second bearing element 4d is arranged between the two legs of a third bearing element 5d, the third bearing surface 5g, which is formed by the third bearing elements 5d, being arranged at a higher level than the second bearing surface 4g. The three third bearing elements 5d which are arranged on the right-hand side are located in a lower position 5a, with the result that the second bearing surface 4g is located at a higher level than the third bearing surface 5g. As soon as the second conveying means 4 has been raised such that the second bearing surface 4g is located above the first bearing surface 3g, the third bearing element 5d can act. If the third bearing element 5d is in its lower position 5a, than a stack S rests on the second bearing elements 4d and can be conveyed by the latter in the conveying direction F2, F5. If the third bearing clement 5d is located in its upper position 5b, then the stack S rests on the third bearing element 5d, is thus not affected by a movement of the second bearing element 4d and thus maintains its position. If a plurality of stacks S are resting on the first or second bearing surface 3g, 4g, then it is possible, by corresponding activation of the second and third conveying means 4, 5 for the stacks S to be conveyed selectively, in particular individually, in the conveying direction F2. FIG. 1 shows such a rearrangement of the stacks SI, SS, SE, said stacks being fed one beside the other to the conveying apparatus 1 in the conveying direction Z, and the conveying apparatus 1 discharging the stacks SI, SS, SE again one after the other in the conveying direction F2.

Figure 3A:
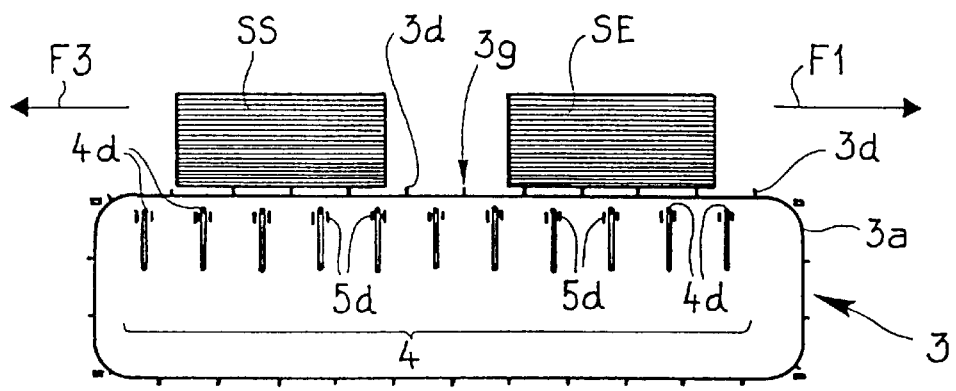
FIG. 3a shows a schematic side view of the conveying apparatus with stacks conveyed by the first conveying means.
Figure 3B:
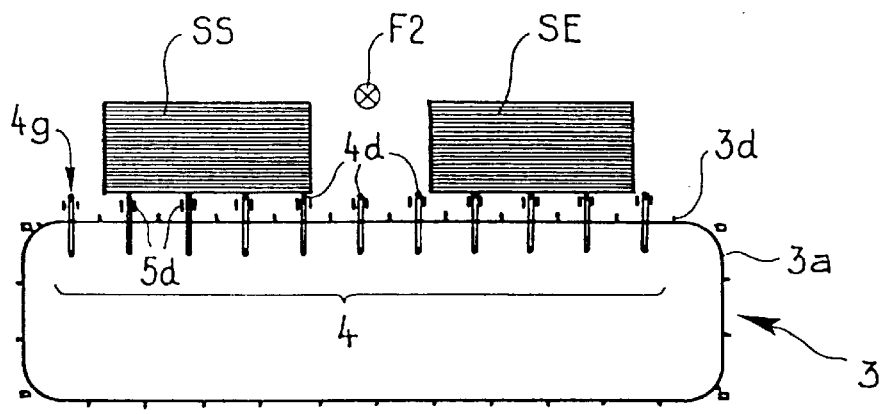
FIG. 3b shows a schematic side view of the conveying apparatus with stacks conveyed by the second conveying means.
Figure 3C:
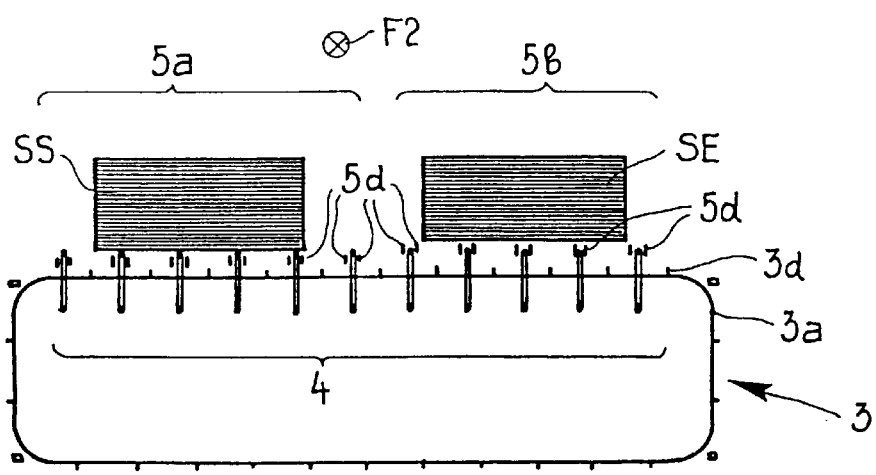
FIG. 3c shows a schematic side view of the conveying apparatus with a stack resting on the second conveying means and a stack resting on the third bearing elements.

FIGS. 3a–3c shows different possible ways of conveying stacks S by means of the conveying apparatus 1 according to the invention. In FIG. 3a, the stacks SE, SS rest on the bearing surface 3g formed by the first bearing elements 3d. The stacks SE, SS can be displaced in the conveying direction F1 or F3 by a corresponding movement of the chain 3a. The second conveying means 4 do not affect the stacks SE, SS.

In the position according to FIG. 3b, the first conveying means 3 has been stopped such that the second bearing elements 4d of the second conveying means 4 come to rest between the first bearing elements 3d. Thereupon, the second conveying means 4 has been raised in the lifting direction H and/or the first conveying means 3 has been lowered, with the result that the bearing elements 4d move up between the bearing elements 3d and the resulting second bearing surface 4g comes to rest at a higher level than the first bearing surface 3g. In this case, the stacks SS, SE are raised up from the first bearing surface 3g and rest on the second bearing surface 4g. Movement of the second bearing elements 4d in the conveying direction F2 allows the stacks SS, SE to be conveyed in this direction.

In the illustration according to FIG. 3c, the third bearing elements 5d, arranged on the second conveying means 4, on the right-hand side are arranged in an upper position 5b, with the result that the stack SE rests on the third bearing surface 5g and the second bearing elements 4d no longer have any effect on the stack SE. Actuation of the second bearing elements 4d allows the stack SS to be moved in the conveying direction F2, whereas the stack SE remains in position. Thereafter, it is possible for the second conveying means 4 to be lowered, for example, as illustrated in FIG. 3a, and for the stack SE to be displaced in the direction F3 by the first conveying means 3 until this stack is located in the previous position of the stack SS, whereupon the second conveying means 4, as is illustrated in FIG. 3b, is raised again and the stack SE is conveyed in the conveying direction F2 by the second bearing elements 4d. As a result, as can also be seen in FIG. 1, the two stacks SS, SE are located one behind the other in the conveying direction F2.

Figure 4:
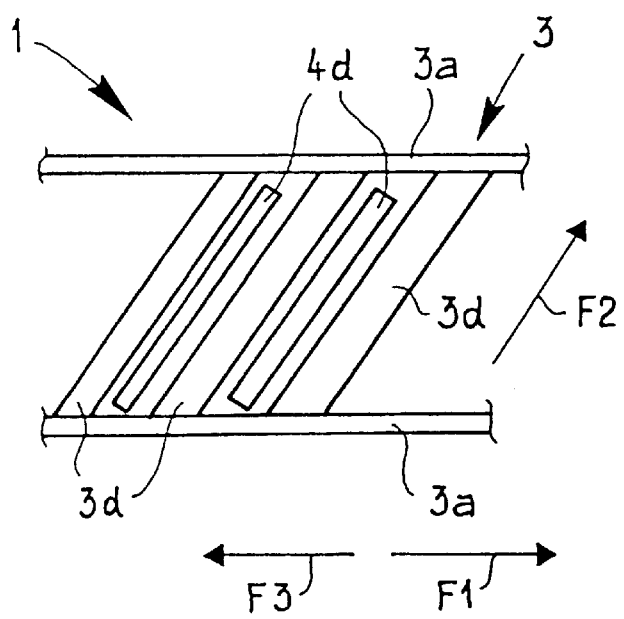
FIG. 4 shows part of a plan view of a further conveying apparatus.

FIG. 4 shows part of a plan view of a conveying apparatus 1 which has a first conveying means 3 which can be displaced in the conveying direction F1, F3 and has chains 3a and first bearing elements 3d. The first bearing elements 3d are aligned transversely tot he conveying direction F1, F3, with the result that the conveying directions F1 and F2 have an angle of less than 90 degrees. The second bearing elements 4d are aligned parallel to the first bearing elements 3d.

The bearing elements 3d, 4d, 5d could be configured in a large number of different embodiments and/or materials so as to form an essentially planar bearing surface 3g, 4g, 5g. The bearing elements could have, for example, a multiplicity of projecting teeth, of which the tips form the bearing surface 3g, 4g, 5g. The bearing surface 3g, 4g, 5g should form a multiplicity of supporting locations for the article S to be conveyed, which can be achieved in that the bearing elements 3d, 4d, 5d are dimensioned, and spaced apart from one another, in accordance with the format of the articles to be conveyed. If the bearing elements 3d, 4d, 5d are spaced apart from one another by a small distance, then articles of different formats, even very large or small formats, can be conveyed reliably.

The conveying apparatus 1, according to the invention, is configured primarily for conveying sheet-like articles, but also allows articles of any desired designs to be conveyed.

The chain 3a of the first conveying means 3 and/or the belt 4d of the second conveying means 4 need not necessarily be configured to run in a circulatory path. It would also be possible for the chain 3a and/or the belt 4d to have two ends which can be would up, for example, on the deflecting roller 3b, 4a and unwound therefrom.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention.

What is claimed is:

1. An apparatus for conveying sheet-like articles, preferably stacks of sheet like articles, comprising:
    a first conveying means, wherein the first conveying means has a plurality of first bearing elements, each of the plurality of first bearing elements having a central axis, which are arranged parallel to one another and define first bearing surface and can be driven such that they can be translated in a direction perpendicular to the central axis, in a first conveying direction;
    a second conveying means, wherein the second conveying means has a plurality of second bearing elements which run parallel to one another and to the first bearing elements and define a second bearing surface, the second bearing elements being designed as conveying elements which can be driven in a second conveying direction, which runs transverse to the first conveying direction; and
    a lifting apparatus, which allows either the first or the second bearing elements to be displaced in a lifting direction, which runs essentially at right angles to the bearing surface, and wherein the first and second bearing elements are configured and spaced apart from one another to form an inter-space, such that, upon displacement in the lifting direction, the second bearing elements can be displaced through the inter-spaces between the first bearing elements, with the result that either the first bearing surface or the second bearing surface is arranged above the other bearing surface.

2. The apparatus as claimed in claim 1, wherein the second bearing elements are designed as conveying belts which are guided over deflecting rollers.

3. The apparatus as claimed in claim 1, wherein the lifting apparatus acts on the first conveying means or on the second conveying means.

4. The apparatus as claimed in claim 1, further comprising:

a third conveying means which has a plurality of third bearing elements which run essentially parallel to one another and to the plurality of second bearing elements and define a third bearing surface, and wherein the third bearing elements can be displaced in the lifting direction through the inter-spaces of the plurality of first bearing elements such that the third bearing surface is arranged above the second bearing surface.

5. A conveying system, comprising an apparatus as claimed in claim 1 for conveying printed products.

6. The apparatus as claimed in claim 1, wherein the first bearing elements are of bar-like design and extend transversely to the first conveying direction.

7. The apparatus as claimed in claim 6, wherein the first bearing elements have depressions on the side which forms the first bearing surface.

8. The apparatus as claimed in claim 1, wherein the inter-spaces are regular.

9. The apparatus as claimed in claim 8, wherein the second bearing elements are designed as conveying belts which are guided over deflecting rollers.

10. The apparatus as claimed in claim 9, further comprising:

a third conveying means which has a plurality of third bearing elements which run essentially parallel to one another and to the plurality of second bearing elements and define a third bearing surface, and wherein the third bearing elements can be displaced in the lifting direction through the inter-spaces of the plurality of first bearing elements such that the third bearing surface is arranged above the second bearing surface.

11. The apparatus as claimed in claim 1, wherein the bearing elements run along a continuous circulatory path.

12. The apparatus as claimed in claim 11, wherein the continuous circulatory path is formed by a chain on which the bearing elements are fastened.

13. The apparatus as claimed in claim 11, wherein the second bearing elements are designed as conveying belts which are guided over deflecting rollers.

14. The apparatus as claimed in claim 13, further comprising:

a third conveying means which has a plurality of third bearing elements which run essentially parallel to one another and to the plurality of second bearing elements and define a third bearing surface, and wherein the third bearing elements can be displaced in the lifting direction through the inter-spaces of the plurality of first bearing elements such that the third bearing surface is arranged above the second bearing surface.

15. An apparatus for conveying sheet-like articles or stacks of sheet like articles, comprising:

a plurality of conveying means, wherein the plurality of conveying means have a plurality of bearing elements, each of the plurality of first bearing elements having a central axis, which are arranged parallel to one another and define a plurality of bearing surfaces and can be driven such that they can be translated in a direction perpendicular to the central axis in at least one conveying direction; and at least one lifting apparatus, which allows the plurality of bearing elements to be displaced in a lifting direction, which runs essentially at right angles to the plurality of bearing surfaces, and wherein the plurality of bearing elements are configured and spaced to form at least one inter-space, such that, upon displacement in the lifting direction, the plurality of bearing elements can be displaced through the at least one inter-spaces between the plurality of bearing elements, with the result that at least one bearing surface is arranged above the at least one other bearing surface.

* * * * *